United States Patent [19]

Martin

[11] 4,126,198
[45] Nov. 21, 1978

[54] THREE-WHEELED FARM VEHICLE

[76] Inventor: Howard H. Martin, 500 Mart Ave., Waterford, Calif. 95386

[21] Appl. No.: 810,203

[22] Filed: Jun. 27, 1977

[51] Int. Cl.² ............................................. B62D 5/00
[52] U.S. Cl. .................................. 180/6.3; 180/26 A; 180/89.13; 180/135
[58] Field of Search .............. 180/6.24, 6.3, 13, 26 R, 180/26 A, 89.13, 135

[56] References Cited

U.S. PATENT DOCUMENTS

| | | | |
|---|---|---|---|
| 2,942,677 | 6/1960 | Gray | 180/26 A |
| 3,360,064 | 12/1967 | Budzich | 180/14 A |
| 3,519,097 | 7/1970 | Commons | 180/26 R |
| 3,672,459 | 6/1972 | Rankins | 180/13 |
| 3,675,966 | 7/1972 | Luft | 180/89.13 |
| 3,910,368 | 10/1975 | Weber | 180/26R |

Primary Examiner—John A. Pekar

Attorney, Agent, or Firm—Lothrop & West

[57] ABSTRACT

A tricycle frame is elongated to carry a sprayer or a fertilizer spreader, or the like. Two transversely spaced rear wheels engage the ground at the rear of the frame and are independently driven by hydraulic motors. A ground engaging front wheel, also independently driven by a hydraulic motor, steers the vehicle. The front wheel is carried on a steering post including a vertical spindle journaled on a framework extending forwardly from the main frame. A cantilever mounted on the steering post projects forwardly beyond the steering wheel and downwardly. On its forward end the cantilever supports a cab housing the operator and the controls of the vehicle. The cantilever construction not only enables the cab to achieve a low profile but allows the cab to swing laterally well in excess of the movement of the steering wheel, thereby affording a clear rear view to the operator in the cab whenever required.

9 Claims, 3 Drawing Figures

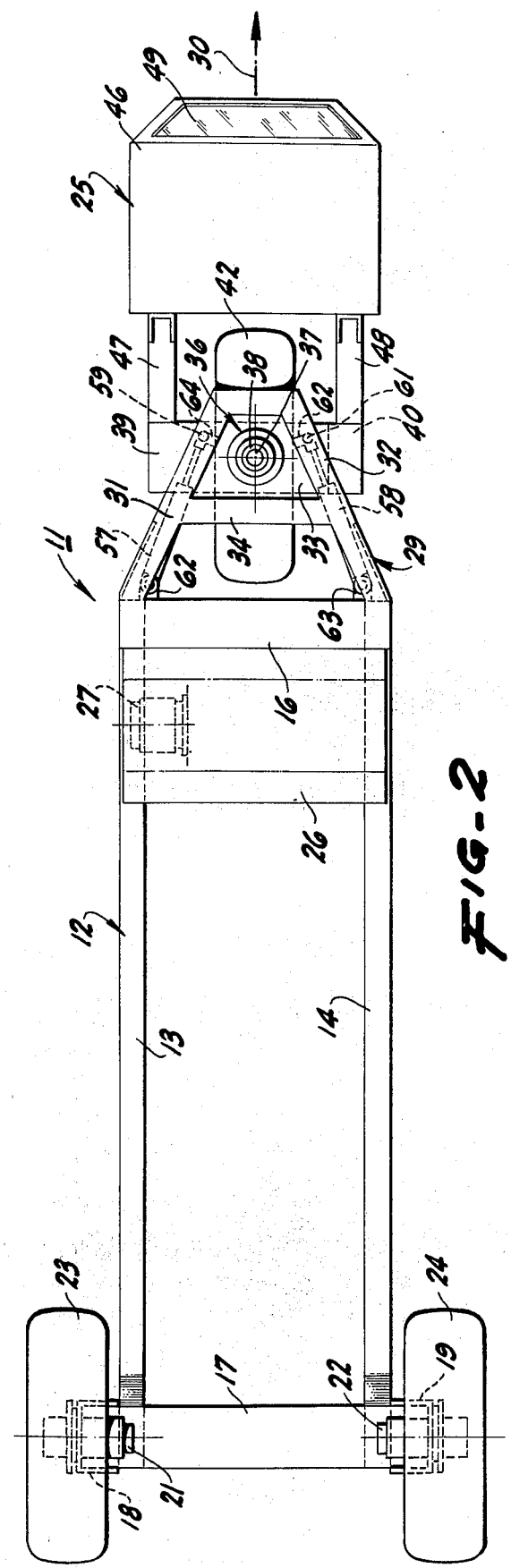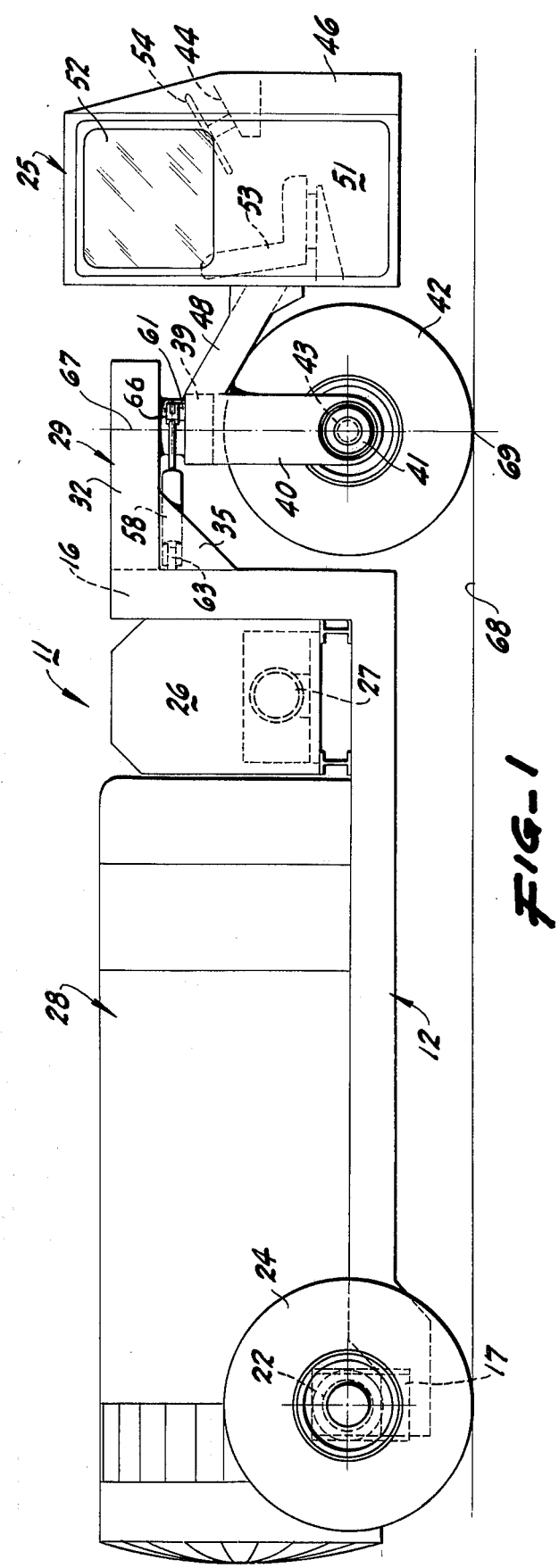

THREE-WHEELED FARM VEHICLE

BACKGROUND OF THE INVENTION

Three-wheeled farm vehicles are well known in the art, the most common being the three-wheel type tractor, which is an engine driven tricycle designed to tow various types of farm equipment. More specifically, the rear wheels are driven to propel the vehicle and the front wheel is pivoted for steering. In most farm tractors the operator sits on a seat between the front and rear wheels and is elevated sufficiently to have a good view in all directions.

The three-wheel tractor design is sometimes also found in vehicles for carrying farm equipment such as sprayers, fertilizer spreaders, seeders and the like. The basic modification is to elongate the frame, providing a space for the equipment behind the operator's seat.

Although such vehicles have been advantageously utilized in farming operations on a large scale basis, they suffer from various drawbacks in particular applications. Since only the front wheel is steerable, the turning radius of such a vehicle, especially if the frame is elongated for carrying equipment, is comparatively large, making the vehicle cumbersome in orchards where the spacing between adjacent trees or the ends of the rows is small and the vehicle is required to perform tight maneuvers. A number of backing and turning operations must often be performed to turn such a vehicle around in close quarters, thus unnecessarily prolonging the required time.

Yet another drawback of conventional three-wheel farm vehicles, particularly in fruit farming, is the position of the operator's seat. In order to provide visibility, the seat position must be relatively high. In many instances, however, the outwardly extending branches of fruit trees are at the height and in the path of the operator. As a result the operator is constantly engaged in trying to avoid the branches, often to the detriment of the job to be performed. Enclosing the seat with a cab to provide operator protection further increases the height of the vehicle, thereby damaging branches coming into engagement with the cab and dislodging fruit carried on the branches so that the fruit drops to the ground and is wasted.

There is, in other words, considerable room for improvement.

SUMMARY OF THE INVENTION

The present invention relates to a three-wheeled farm vehicle having a cab cantilevered ahead of the front wheel and located at about the same height as the front wheel, thus affording an extremely low profile. Further, the front wheel and the cab pivot as a unit, allowing the operator to swing the cab laterally (by turning the front wheel to either side) and obtain an unobstructed rear view without moving the remainder of the vehicle.

It is an object of the invention to provide a three-wheeled farm vehicle having a lower profile than that of any comparable farm vehicle known heretofore.

It is another object of the invention to provide a three-wheeled farm vehicle of improved maneuverability.

It is yet another object of the invention to provide protection for a vehicle operator during farming operations, particularly in orchards.

It is still another object of the invention to reduce damage to overhanging branches and the crop thereon in fruit and nut farming operations.

It is a further object of the invention to provide a farm vehicle which enables the operator quickly to obtain a full rear view on either side of the vehicle despite the cab's low height.

It is an additional object of the invention to provide a farm vehicle which, owing to the low elevation of the cab above the ground, greatly facilitates getting in and out of the cab.

It is another object of the present invention to provide a generally improved three-wheeled farm vehicle.

Other objects, together with the foregoing, are attained in the embodiment described in the following description and illustrated in the accompanying drawing.

BRIEF DESCRIPTION OF THE DRAWING

FIG. 1 is a side elevation of a three-wheeled farm vehicle embodying the present invention carrying a sprayer;

FIG. 2 is an overhead plan view of the vehicle with the steering wheel in a fore and aft position and with the sprayer removed; and, FIG. 3 is similar to FIG. 2 but with the steering wheel angularly oriented, either to provide the operator in the cab with an unobstructed rear view or to turn the vehicle.

DESCRIPTION OF THE PREFERRED EMBODIMENT

Figure 3:
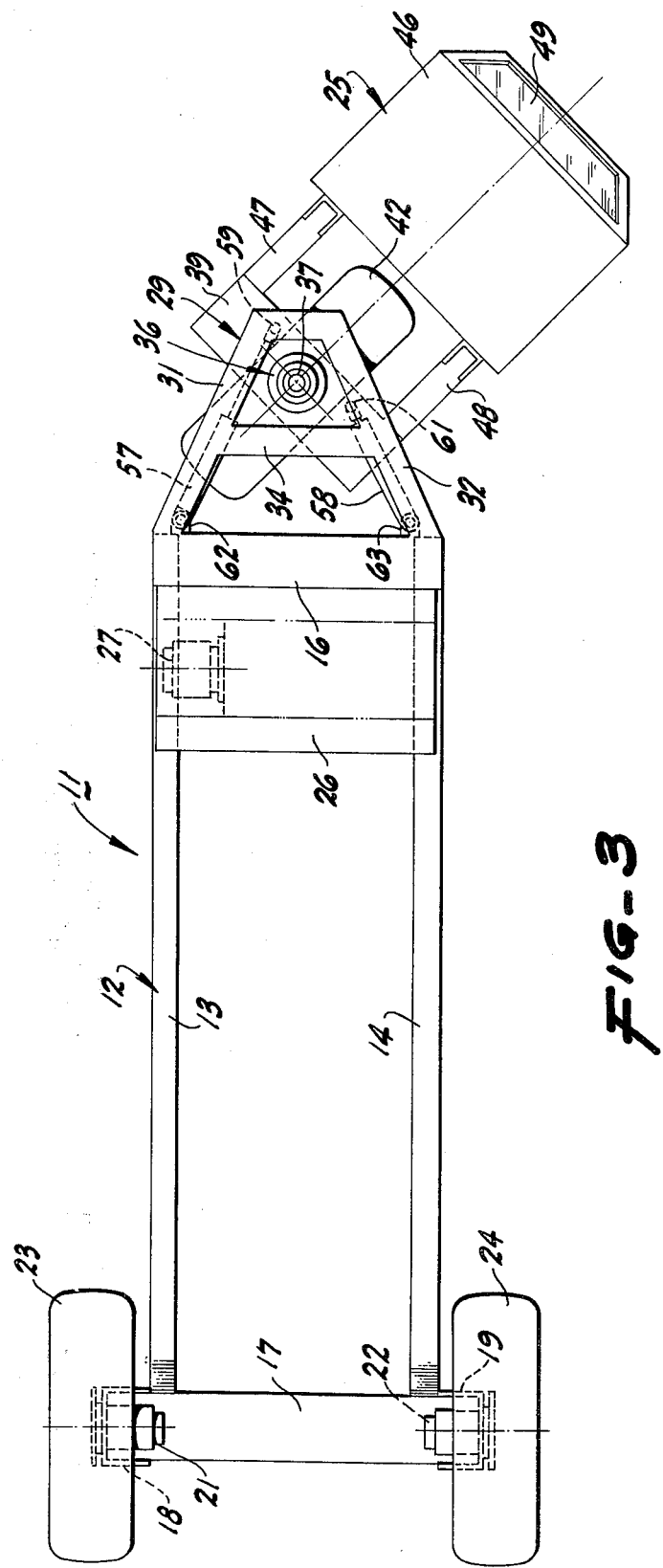

While the three-wheeled farm vehicle of the invention is susceptible of numerous physical embodiments, depending upon the environment and requirements of use, the herein shown and described embodiment has been made, tested and used, and has performed in an eminently satisfactory manner.

A three-wheeled farm vehicle embodying the present invention is generally designated by the reference numeral 11 and comprises an elongated frame 12, or chassis, including a pair of parallel, fore and aft beams 13 and 14 connected at their forward ends to the lower after corners of a transverse, rectangular, upstanding front wall 16. Spanning the after ends of the beams 13 and 14 is a strongly constructed cross beam 17. On the transversely projecting outer ends of the cross beam 17 are located hydraulic motor mounts 18 and 19 carrying hydraulic motors 21 and 22, respectively, which drive respective ground engaging wheels 23 and 24. The wheels 23 and 24 are independently driven to propel the vehicle 11 in a fore or aft direction, as required.

An internal combustion engine 26 is mounted on the frame 12 aft of the front wall 16. The engine 26 drives a hydraulic pump 27 which supplies the high pressure hydraulic fluid required to drive the motors 21 and 22 on the respective wheels 23 and 24, through conventional conduits, not shown.

The vehicle 11 is shown in FIG. 1 as carrying a piece of farm equipment, such as a sprayer 28, on the frame 12 aft of the motor 26 and pump 27. It is to be noted that other types of equipment and accessories could, with equal facility, be carried in lieu of the sprayer.

A framework 29 is connected to and extends horizontally forwardly from the upper end of the front wall 16.

As appears most clearly in FIGS. 2 and 3, the framework 29 is in the form of a horizontal A-frame and comprises a first diagonal beam 31 which connects with a second diagonal beam 32 at a central forward position on a vertical plane including the fore and aft path of the vehicle as indicated by the arrow 30 in FIG. 2. A horizontal cross plate 33 made of thick steel plate and a strong horizontal 34 span the diagonal beams 31 and 32. As shown in FIG. 1 a vertical gusset 35, or brace, of right triangular shape welded between the wall 16 and the diagonal beam 32 provides support and rigidity to the A-frame 29. A similar triangular brace is provided on the opposite side of the frame 12, although not visible in the drawing.

The horizontal A-frame 29, in summary, cantilevers forwardly from the upper end of the front wall 16 and is very sturdily constructed to provide a secure and rigid mounting for the steering wheel and cab unit, generally designated by the reference numeral 25, as will now be described.

The cab and steering wheel unit 25 comprises a steering post, generally designated by the reference numeral 36, including a large vertical spindle 37 journaled in a vertically oriented bearing 38 carried on the A-frame 29. The bottom end of the spindle 37 is mounted on a hollow transverse beam 39 of strong welded plate construction, the beam 39 providing the moment arm required to effect steering.

Depending from one end of the transverse beam 39 is a wheel supported column 40, a hydraulic motor 41 being mounted on the bottom of the column for driving connection to the wheel 42. The front wheel 42 is rotatably mounted on a horizontal axle 43 carried on the bottom of the column 40 and is independently driven by hydraulic motor 41 also connected by suitable conduits, not shown, to the hydraulic pump 27 and to a control panel 44 in the operator's cab 46.

The operator's cab 46 is rigidly attached to the lateral extremities of the transverse moment arm beam 39 of the steering post 36 by a pair of fore and aft supporting beams 47 and 48, respectively. The cab 46 extends forwardly of the steering post 36 in a cantilever manner and overhangs the front wheel 42 as appears most clearly in FIG. 1. It will be noted that the cab 46 is placed in a very low position which is well clear of most overhanging branches of orchard fruit trees. The cab 46 is provided with a front window 49 and a side door 51 having a side window 52. A similar door and side window are provided on the other side of the cab 46, although not visible in the drawing. Also provided in the cab 46 are an operator's seat 53, a steering wheel 54 and the control panel 44, the latter containing the operating controls and dials for the engine 26, the hydraulic motors 21, 22 and 41 and various other parts of the vehicle 11.

In order to steer the vehicle 11 to the left or right of the path 30, or to swing the cab to the left or right in order to provide a rear view, left and right hydraulic jacks 57 and 58 are connected between the left and right sides of the wall 16 and the left and right ends of the transverse beam 39, respectively. More specifically, left and right clevis pins 59 and 61 of a suitable size are mounted on and extend upwardly from the left and right upper surfaces of the transverse beam 39. Lugs 62 and 63 are securely welded to the respective left and right upper outer portions of the front surface of the front wall 16 just below the A-frame 29. The jack 57 is pivotally connected at its after end to the lug 62 and at its forward end a clevis 64 is pivotally connected to the pin 59; and the jack 58 is similarly connected between the lug 63 and pin 61 by a clevis 66.

The hydraulic pump 27, the hydraulic jacks 57 and 58 and the controls in the cab 46 are appropriately interconnected by flexible hydraulic lines which are not shown for simplicity of illustration.

The vehicle 11 is propelled forwardly or backwardly by actuating the motors 21, 22 and 41 as desired. To turn the vehicle 11 in a right-hand direction relative to the path 30, as sequentially appears in FIGS. 2 and 3, the hydraulic jack 57 is actuated so as to project and thereby pivot the steering wheel and cab unit 25 including the front wheel 42, the steering post 36, and the cab 46 in a clockwise direction about the vertical axis of the spindle 37. Simultaneously, the hydraulic jack 58 may be either deactuated or actuated to retract, as is suitable in the particular circumstance. To turn in the opposite direction, or toward the left of the path 30, the hydraulic jack 58 is projected and the jack 57 is deactuated or retracted. The jacks 57 and 58 are controlled automatically by the operator's movement of the steering wheel 54.

The turning radius may be greatly reduced or even made negative by selectively applying a hydraulic lock to one or the other of the motors 21 and 22 or by driving the appropriate motor in reverse. For example, to turn right the motor 22 may be locked and the motor 21 driven in a forward direction while appropriately manipulating the steering wheel 54. To reduce even further the turning radius, the motor 22 may be driven in reverse.

It is of especial interest to note that by immobilizing the two rear hydraulic motors 21 and 22 and the front hydraulic motor 41, the steering wheel and cab unit 25 can readily be swung from the fore and aft position shown in FIG. 2 to the angularly displaced arrangement illustrated in FIG. 3 should the operator desire to take a look toward the after end of the vehicle and the path recently traversed by the vehicle. Since the only engagement between the forward end of the vehicle and the ground 68 is at the point of contact 69 between the front wheel 42 and the ground 68, appropriate actuation of the jacks 57 and 58 will rotate the wheel and cab unit 25 about the vertical axis 67 of the steering post 36 to the extent desired in either direction.

It will thus be seen that the present farm vehicle enjoys a number of advantages over prior art vehicles in that the profile is lowered and the maneuverability is greatly improved. In addition, the operator is protected from overhanging branches in the forwardly overhanging cab while being afforded a good view in all directions. Operator comfort is assured, thereby reducing fatigue. Preferably, the cab 46 is sealed and insulated; and heating and air conditioning apparatus can be installed for operation in inclement and uncomfortable weather.

Various modifications will become possible for those skilled in the art after receiving the teachings of the present disclosure without departing from the scope thereof. For example, although the present farm vehicle is shown and described herein as having three wheels, the novel principles of the invention may be adapted to vehicles having four wheels.

It can therefore be seen that I have provided a farm vehicle which is especially useful in an orchard environment wherein a low profile must be maintained to avoid damage to tree and fruit but where good visibility and ready maneuverability are also required.

What is claimed is:

1. A three-wheeled farm vehicle comprising:

a. a fore and aft elongated frame;
b. a pair of ground engaging rear wheels supporting the after end of said frame;
c. a vertical steering post journaled on the forward end of said frame;
d. a ground engaging front wheel rotatably attached to said steering post, said front wheel being capable of supporting said forward end of said main frame and of pivoting about the vertical axis of said steering post in unison with said steering post;
e. a cantilever mounted at one end on said steering post, the other end of said cantilever extending beyond the forward extremity of said front wheel;
f. a cab containing an operator's station mounted on said other end of said cantilever forwardly of said front wheel, said cantilever being of sufficient length to swing said cab laterally beyond said frame far enough to provide an unobstructed rear view from said cab in a line of sight alongside said frame, the top of said cab being substantially coextensive in a vertical direction with the highest portion of said frame; and,
g. steering means connected between said frame and said steering post for producing unitary pivoting movement of said steering post, said front wheel and said cab relative to said frame.

2. A vehicle as in claim 1 further comprising drive means connected between said frame and said rear wheels for producing rotational movement of said rear wheels relative to said frame and thereby propelling the vehicle.

3. A vehicle as in claim 2 in which said drive means comprises means for driving each of said rear wheels independently of the other.

4. A vehicle as in claim 3 including means for driving said front wheel.

5. A vehicle as in claim 2 in which the said drive means comprises a hydraulic motor connected to each of said rear wheels.

6. A vehicle as in claim 5 in which said drive means further comprises an internal combustion engine mounted on said frame, a hydraulic pump carried on said frame in driven relation to said engine, and conduits connecting said pump and said hydraulic motors for conducting hydraulic fluid thereto.

7. A vehicle as in claim 1 in which said steering means comprises a hydraulic jack.

8. A vehicle as in claim 1 further comprising steering and drive controls in said cab.

9. A vehicle as in claim 1 in which said cab is provided with front and side windows.

* * * * *